United States Patent [19]
Strenzke et al.

[11] Patent Number: 5,111,658
[45] Date of Patent: May 12, 1992

[54] METHOD OF BRAKING A VEHICLE

[75] Inventors: Hilmar Strenzke, Aschaffenburg; Norbert Fehn, Elsenfeld, both of Fed. Rep. of Germany

[73] Assignee: Linde Aktiengesellschaft, Fed. Rep. of Germany

[21] Appl. No.: 478,368

[22] Filed: Feb. 12, 1990

[51] Int. Cl.⁵ .............................................. F16D 31/02
[52] U.S. Cl. ...................... 60/327; 60/449; 60/466; 60/490
[58] Field of Search ............... 60/327, 368, 449, 466, 60/489, 490, 327

[56] References Cited

U.S. PATENT DOCUMENTS

| | | | |
|---|---|---|---|
| 3,285,000 | 11/1966 | Christenson et al. | 60/449 |
| 4,672,811 | 6/1987 | Yoshida et al. | 60/449 |
| 4,956,972 | 9/1990 | Sasajima et al. | 60/327 |
| 4,958,492 | 9/1990 | Maki et al. | 60/327 |
| 4,970,862 | 11/1990 | Maki et al. | 60/327 |

Primary Examiner—Edward K. Look
Assistant Examiner—F. Daniel Lopez
Attorney, Agent, or Firm—Webb, Burden, Ziesenheim & Webb

[57] ABSTRACT

A method a braking a vehicle which has a drive motor, a hydrostatic drive unit including adjustable hydraulic machines having adjusting devices, and an electronic subassembly controlling the adjusting devices of the hydraulic machines. Continuous adjustment of the hydraulic machines permits the drive motor to exert a braking moment that slows the movement of the vehicle. The method includes rapidly adjusting the hydraulic machines by the electronic subassembly toward a setting that relieves the drive motor completely or partially after a limiting rpm value on the drive motor is exceeded and the higher pressure present in the hydrostatic drive unit reduces the braking energy through the adjusting devices until the speed of the drive motor drops below the limiting rpm value. At this time, the electronic subassembly again adjusts the hydraulic machines to utilize the braking moment. The sequence is repeated until the braking moment imparted by the drive motor is sufficient to prevent exceeding the limiting rpm value of the drive motor.

2 Claims, 2 Drawing Sheets

METHOD OF BRAKING A VEHICLE

BACKGROUND OF THE INVENTION

The invention is a method for braking a vehicle which includes having a drive motor, a hydrostatic drive unit and adjustable hydraulic machines, and an electronic subassembly that controls adjusting devices for the hydraulic machines. machines.

In the method the drive motor provides a braking moment to decrease the vehicle speed by continuously adjusting the hydraulic machines. For example, a diesel engine sill decelerate a moving vehicle when the accelerator pedal setting of the engine is reduced since this will reduce the engine speed. The braking moment of the diesel engine depends upon the ratio between the rpm of the engine and the rpm of the vehicle wheels. Thus, in order to increase the braking movement of the engine, the ratio must be changed. This is accomplished, for example, by changing from the fourth gear of a mechanical gear box to the third gear. For a vehicle having a hydrostatic transmission, it is necessary to adjust the hydraulic machines by swinging in the hydrostatic pump, i.e., reducing its stroke volume, or by swinging out the hydrostatic motor, i.e., increasing its stroke volume, or by making both of these adjustments.

It is known to utilize the braking moment of a drive motor, e.g., a diesel engine, to brake a vehicle by controlling adjustable hydraulic machines with an electronic subassembly so that a temporary transmission change inside of the hydrostatic drive unit to decrease the speed of the vehicle. For example, in a conventional hydrostatic drive unit with a primary control, i.e., with an adjustable hydraulic axial piston pump, and a constant hydraulic motor with the pump adjusted to the full-load setting, the maximum angle of traverse is controlled so that the angle of traverse is returned within a specific time to a minimum value or to zero. The length of the time interval between the maximum angle of traverse and the minimum value or zero determines the intensity of the braking, provided the braking moment of the drive motor is sufficient to stop the vehicle. A relatively short interval causes rapid braking, while a longer interval results in slower braking.

When the braking moment of the drive motor is no longer sufficient to assure a decrease in vehicle speed, additional braking will be required by the manual actuation of an additional brake by the vehicle operator. This may be necessary in rapid braking or in traveling downhill in order to prevent the drag moment exerted on the drive train by the vehicle, which can in such a situation far exceed the braking moment available from increasing the rpm of the drive motor and the hydraulic machines.

If operator intervention is unavailable, both the hydraulic machines of the hydrostatic drive unit and the drive motor will become overloaded and damaged.

The invention provides a method for braking a vehicle that renders the manual actuation of an additional brake by the operator unnecessary and prevents overspeeding of the drive motor.

SUMMARY OF THE INVENTION

A vehicle having a drive motor and a hydrostatic drive unit consisting of adjustable hydraulic machines is braked by using the braking moment of the drive motor. An electronic subassembly continuously adjusts the hydraulic machines. In order to prevent overspeeding of the drive motor in braking the vehicle without requiring manual intervention by the operator, the electronic subassembly adjusts the hydraulic machines limiting rpm value on the drive motor is exceeded and the pressure present in the hydrostatic drive unit is reduced until the rpm drops below the limiting value. Then the hydraulic machines are again adjusted to utilize the braking moment of the drive motor. This process is repeated until the braking moment of the drive motor is sufficient to assure vehicle braking without overspeeding of the drive motor.

BRIEF DESCRIPTION OF THE DRAWINGS

The invention is explained hereinafter in connection with the following exemplary drawing figures.

DESCRIPTION OF THE PREFERRED EMBODIMENT

Figure 1:
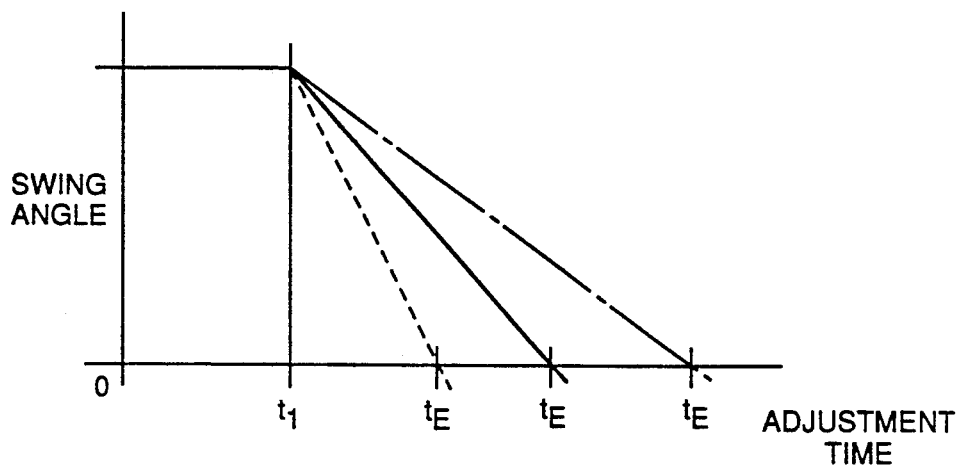
FIG. 1 shows a schematic diagram of normal braking according to the prior art.

A drive motor, i.e., a diesel engine 3, is coupled to a hydrostatic drive which includes a hydraulic pump P. The hydraulic pump is adjustable by a servo system 6 which is located at the pump. The hydrostatic drive includes a hydraulic motor which is controlled by a servo system 7. The hydraulic pump is connected to the hydraulic motor in a closed circuit. At least one pressure limiting valve (not shown) is installed inside either the hydraulic pump or the hydraulic motor. The hydraulic motor is coupled to a drive axle of a vehicle. An electronic subassembly 1 is connected to a speed sensor 2 which monitors the speed of starter rim 4 of drive motor 3. The servo systems 6 and 7 of the pump and the motor, respectively, are connected to and control the gear ratio of the hydrostatic drive.

According to the method of the invention after a limiting rpm value of the drive motor is exceeded, an electronic subassembly causes a rapid adjustment of the hydraulic machines toward a setting that relieves the drive motor completely or partially and the higher pressure present in the hydrostatic drive unit reduces the braking energy by means of pressure limiting valves until the rpm of the drive motor drops below the limiting rpm value, at which point the electronic subassembly again adjusts the hydraulic machines to utilize the braking moment. This sequence is repeated until the braking moment provided by the drive motor is sufficient to prevent the limiting rpm value of the drive motor from being exceeded.

The return of the pump to the zero position and the transmission change in the hydrostatic drive unit associated with it occur so rapidly that the drive motor does not absorb any drag moment. The drive motor is then completely uncoupled from the drive unit. The sudden return of the pump to the zero position causes a rapid high pressure rise that is relieved in the hydrostatic drive unit by pressure limiting valves. In this stage a decrease in the speed of the vehicle is caused exclusively by the pressure limiting valves, which convert the drag energy of the vehicle primarily into heat.

If the rpm again drops below the limiting value of the drive motor, which is reported by a suitable sensor of the drive motor to the electronic subassembly, the pump is shifted into its original angle of traverse setting just as rapidly as it was returned to the zero return. Then the braking process is continued by continuous adjustment of the pump toward the zero position, with the utilization of the braking moment made available by the drive motor. If the braking moment of the drive motor is not yet sufficient, the limiting rpm value is again exceeded and the pump is again returned very rapidly to the zero position by the control signals of the electronic subassembly, whereupon braking is caused by the pressure limiting valves in the hydrostatic drive unit. This process is repeated until the drive Braking is concluded by a final return of the pump to the zero position because now the braking moment of the drive motor is now greater than the drag moment of the vehicle.

In order to avoid hard braking of a vehicle, a refinement according to the method of the invention may be utilized. In the refinement when a limiting rpm of the drive motor is exceeded, the electronic subassembly causes a rapid adjustment of the hydraulic machines toward a setting that relieves the drive motor along with an associated pressure reduction in the hydrostatic drive unit at selectable intervals. This adjustment is caused by the pressure limiting valves and a new setting is obtained which loads the drive motor until the rpm drops below the limiting rpm. Thus, excessively hard braking of the vehicle is avoided.

The action of the electronic subassembly on the adjusting devices of the hydraulic machines does not need to be limited to the action on the pump of a hydrostatic drive unit. It is also conceivable to apply the action to an adjustable motor of a hydrostatic drive unit. Several pumps or several motors in a hydrostatic drive unit may also be controlled, provided the pumps or motors are adjustable.

In the normal braking process shown schematically in FIG. 1 of the drawings, the braking moment of the drive motor is sufficient to bring the vehicle to a stop with no overspeeding of the drive motor or the hydraulic components of the hydrostatic drive unit. The time required for adjusting the swing angle of an axial piston pump is plotted on the abscissa, and the swing angle value on the ordinate. The swing angle of an axial piston pump is in its maximum position at the time $t_1$. Braking is to be initiated at this point in time. The swing angle of traverse is then continuously returned according to a ramp function until it reaches the zero value at time $t_E$, by which time braking is concluded. Depending upon the steepness of the ramp slope, braking occurs more rapidly or more slowly.

Figure 2:
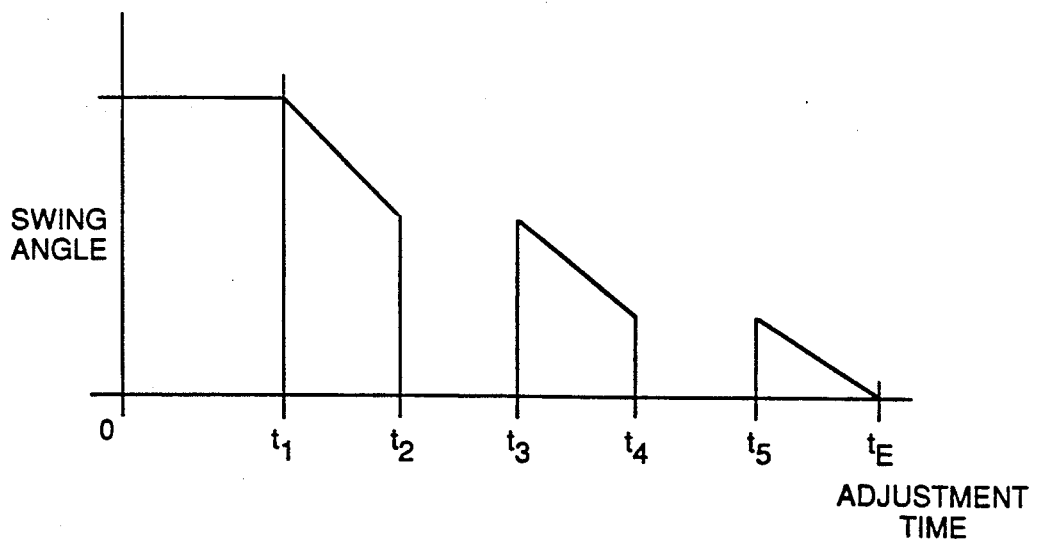
FIG. 2 shows a schematic diagram of braking according to the method of the invention.
Figure 3:
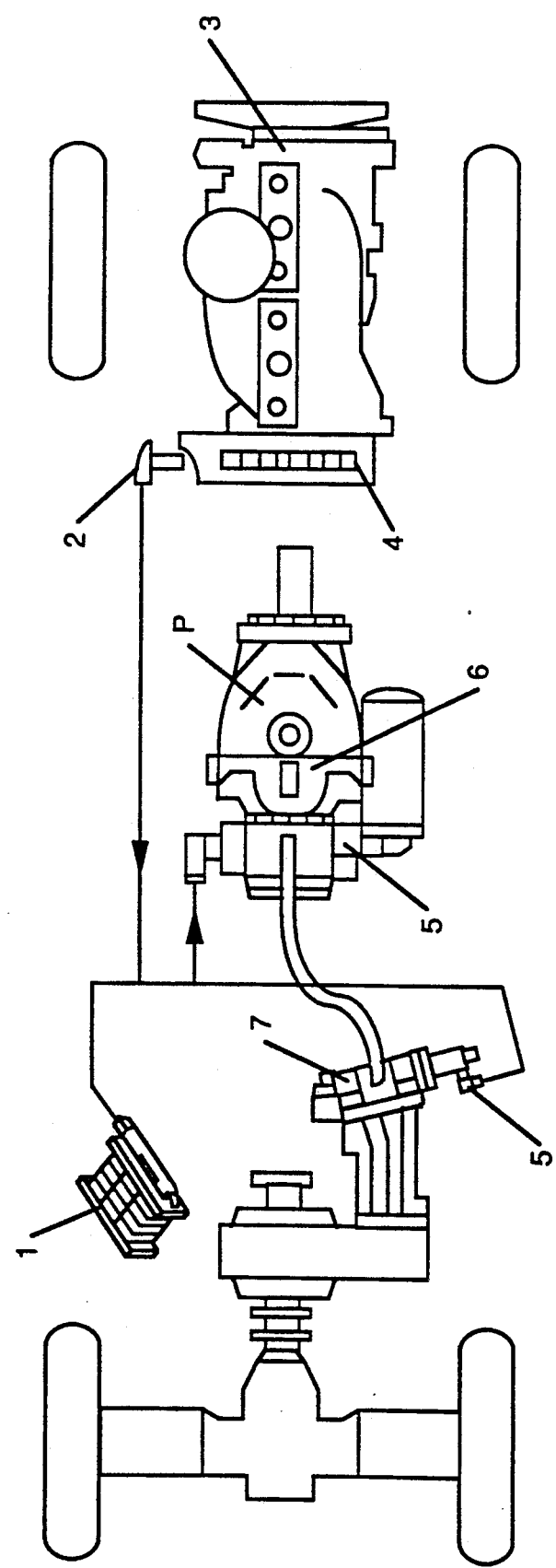
FIG. 3 shows a vehicle control system including the elements of the invention.

In the braking process shown schematically in FIG. 2 of the drawings, the drive motor exceeds the critical limiting rpm value. At time $t_1$ the braking process is instituted and the angle of traverse of the pump is continuously retracted. At time $t_2$ a critical rpm value is exceeded at the drive motor because its braking moment is not sufficient to continue the braking process. Therefore, the angle of traverse of the pump is rapidly returned to zero so that braking no longer occurs because the drive motor is uncoupled from the hydrostatic drive unit. In this stage braking occurs exclusively by the pressure limiting valves of the hydrostatic drive unit. If the rpm of the uncoupled drive motor drops below the critical limiting rpm value at time $t_3$, the angle of traverse of the pump is again rapidly adjusted to its previous value and braking is continued through the drive motor up to time $t_4$, at which time the limiting rpm value is again exceeded. This type of jerky braking is repeated until the braking moment of the drive motor is sufficient to prevent overspeeding of the drive motor.

While a preferred embodiment of the invention is described herein, it is to be understood that the invention may be otherwise embodied within the scope of the appended claims.

We claim:

1. A method of braking a vehicle having a drive motor, a hydrostatic drive unit including adjustable hydraulic machines with adjusting devices, and an electronic subassembly controlling said adjusting devices for said hydraulic machines, whereby by continuous adjustment of said hydraulic machines, said drive motor can exert a braking moment that slows the movement of said vehicle, including rapidly adjusting said hydraulic machines at selectable intervals by said electronic subassembly toward a setting that relieves said drive motor after a limiting rpm value on said drive motor is exceeded with associated energy reduction in said hydrostatic drive unit by pressure limiting valves and associated renewed adjustment of said hydraulic machines that loads said drive motor, until the rpm of said drive motor drops below the limiting rpm value.

2. A method of braking a vehicle having a drive motor, a hydrostatic drive unit including adjustable hydraulic machines, adjusting devices for said hydraulic machines, and an electronic subassembly controlling said adjusting devices, wherein continuous adjustment of said hydraulic machines causes said drive motor to exert a braking moment that decreases the speed of said vehicle, said method including rapidly adjusting said hydraulic machines by said electronic subassembly toward a setting that decreases the speed of said driver motor when a limiting rpm of said drive motor is exceeded and the pressure in said hydrostatic drive unit increases to reduce the braking energy through said adjusting devices until the speed of said drive motor drops below the limiting rpm, whereupon said electronic subassembly adjusts said hydraulic machines to utilize the braking moment imparted by said drive motor and repeating the sequence until the braking moment imparted by said drive motor prevents exceeding the limiting rpm of said drive motor.

* * * * *

UNITED STATES PATENT AND TRADEMARK OFFICE
CERTIFICATE OF CORRECTION

PATENT NO. : 5,111,658

DATED : May 12, 1992

INVENTOR(S) : Hilmar Strenzke and Norbert Fehn

It is certified that error appears in the above-identified patent and that said Letters Patent is hereby corrected as shown below:

On the Title page, item [57],
Abstract Line 1 after "method" replace "a" with --of--.

Column 1 Line 6 delete "having".

Column 1 Line 9 "machines. machines." should read --machines.--.

Column 1 Line 13 "sill" should read --will--.

Column 2 Line 3 after "machines" insert --into a setting that relieves the drive motor when a--.

Column 2 Line 17 delete "and".

Column 3 Line 2 after "zero" insert --position, and no braking action takes place during the--.

Column 3 Line 12 after "drive" insert --motor speed no longer exceeds the limiting rpm value.--.

UNITED STATES PATENT AND TRADEMARK OFFICE
CERTIFICATE OF CORRECTION

PATENT NO. : 5,111,658

DATED : May 12, 1992

INVENTOR(S) : Hilmar Strenzke and Norbert Fehn

It is certified that error appears in the above-identified patent and that said Letters Patent is hereby corrected as shown below:

Column 3 Line 14 after "because" delete --now--.

Column 3 Lines 46-47 delete "of traverse".

Claim 1 Line 24 Column 4 "whereby by" should read --wherein by--.

Claim 2 Line 46 Column 4 "driver" should read --drive-- (first occurrence).

Signed and Sealed this

Seventeenth Day of August, 1993

Attest:

BRUCE LEHMAN

Attesting Officer

Commissioner of Patents and Trademarks